Nov. 24, 1964
R. B. WALLACE
3,157,894
METHOD AND APPARATUS FOR PRODUCING A DEVICE HAVING A
FRICTION PLUG ROTATABLY INSERTED THEREIN
Filed April 30, 1962
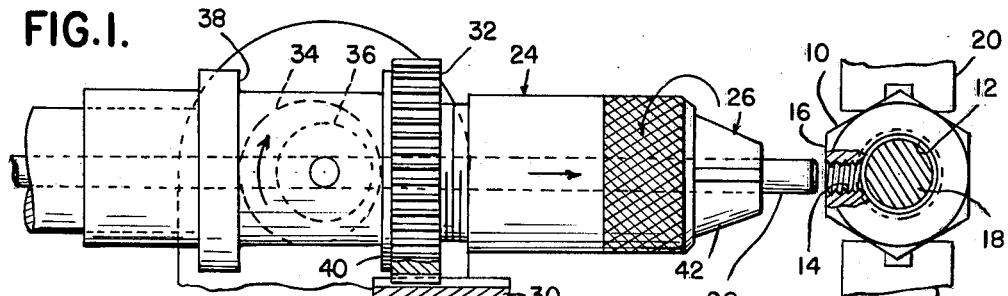
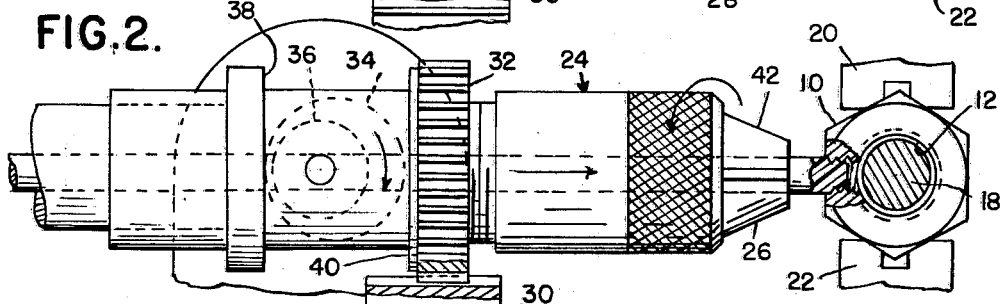
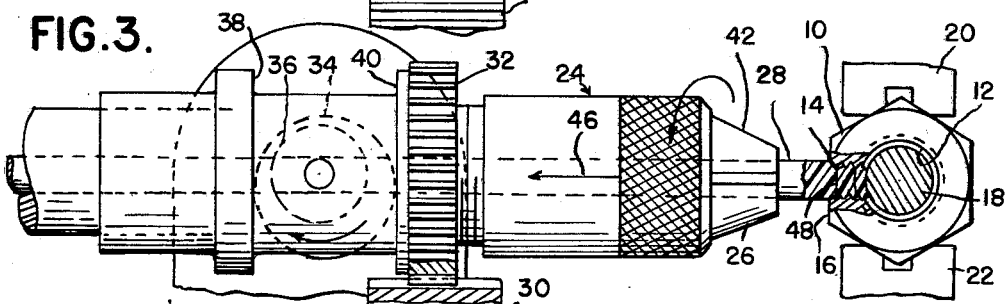
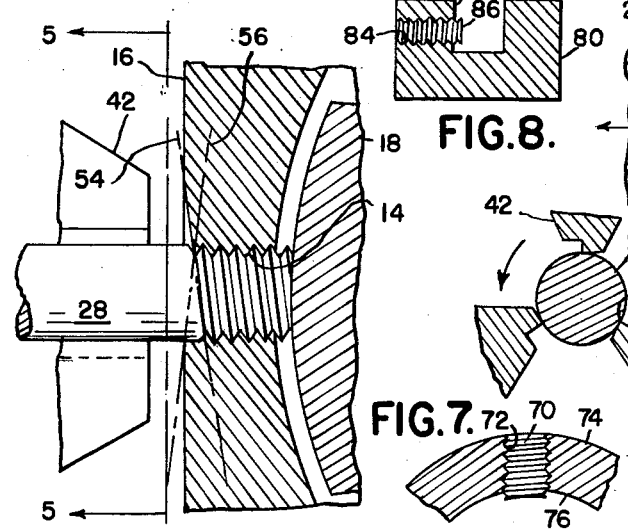
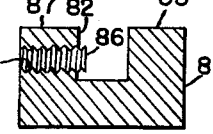
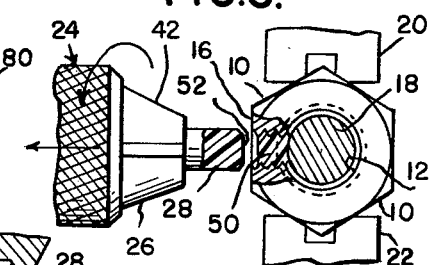
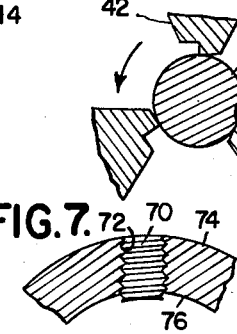
INVENTOR.
RICHARD B. WALLACE
BY Whittemore
Hulbert & Belknap
ATTORNEYS

United States Patent Office 3,157,894
Patented Nov. 24, 1964

3,157,894
METHOD AND APPARATUS FOR PRODUCING A DEVICE HAVING A FRICTION PLUG ROTATABLY INSERTED THEREIN
Richard B. Wallace, Bloomfield Hills, Mich., assignor to The Oakland Corporation, Birmingham, Mich., a corporation of Michigan
Filed Apr. 30, 1962, Ser. No. 190,985
13 Claims. (Cl. 10—72)

The present invention relates to a device having a friction plug inserted therein, and to a method and apparatus for producing the same.

It is an object of the present invention to provide a lock nut in the form of a body having a threaded bolt-receiving opening extending therethrough, a threaded plug-receiving opening extending through a side wall of the nut, a plug in said plug-receiving opening, the inner end of said plug extending a predetermined distance into the bolt-receiving opening, the outer end of said plug terminating within the plug-receiving opening substantially along the first convolution of thread in said threaded plug-receiving opening at the radially outer end thereof.

It is a further object of the present invention to provide a lock nut of the type referred to in the preceding paragraph in which the inner end of said plug has a concave shape conforming generally to a bolt in the bolt-receiving opening.

It is a further object of the present invention to provide a lock nut of the character described in which a length of plug material is threaded through the plug-receiving opening until its inner end extends a predetermined distance into the bolt-receiving opening, after which the plug material is twisted off with a line of fracture located substantially along the crest of the first outer thread convolution in the threaded plug-receiving opening.

It is a further object of the present invention to provide apparatus for positioning a plug in a laterally extending plug-receiving opening extending from a side wall of a nut body into the central bolt-receiving opening thereof, comprising a plug stop element received within the bolt-receiving opening of the nut body, means for engaging the outer end of the threaded plug-receiving opening with the end of a length of plug material and for effecting relative rotation between the plug material and nut body about the axis of the plug-receiving opening to cause the plug material to be threaded into and through the opening, and continuing the relative rotation until the end of the plug material engages the plug stop element and thereafter twists off the plug material within the plug-receiving opening substantially along the crest of the first thread convolution at the outer end of the plug-receiving opening.

More specifically, it is an object of the present invention to provide apparatus comprising means for supporting a nut body having a threaded bolt-receiving opening and a threaded plug-receiving opening extending radially from a side of the nut body into the bolt-receiving opening, including a mandrel to be positioned within said bolt-receiving opening with predetermined clearance with respect thereto, means for advancing and rotating a length of plug material to bring the end thereof into engagement with the outer end of the plug-receiving opening and to screw said plug material into and through said plug-receiving opening into engagement with said mandrel and being effective thereafter to twist off the inserted plug along a fracture line located within the plug-receiving opening and extending generally along the crest of the first thread convolution therein.

It is a further object of the present invention to provide apparatus as described in the preceding paragraph in which the means for advancing and rotating the plug material has longitudinally sliding frictional engagement therewith, and in which after the leading end of the plug material has been partially threaded in the plug-receiving opening of the nut body, the means is retracted along the plug material while continuing to maintain rotative driving relation therewith.

It is a further object of the present invention to provide apparatus of the character described comprising a nut support including a plug stop element shaped to enter the threaded bolt-receiving opening of the nut body, a head supporting a length of plug material, means for rotating the head, means for moving the head toward and away from the nut support, said head having a frictional sliding grip longitudinally of said plug material, means for advancing the head while rotating to engage the end of the plug material in the threaded plug-receiving opening of the nut body and during continued rotation thereof to retract the head to slide longitudinally of the plug material while maintaining rotative driving relation with respect thereto, the retracting movement of said head being timed to complete its retracting movement just after the plug material has twisted off within the plug-receiving opening in the nut body to provide a fresh end of the plug material at a position spaced from the outer end of the lateral plug-receiving opening of the next nut body to be positioned on said support.

It is a further object of the present invention to provide apparatus for advancing an elongated plug material in threaded relation into a lateral threaded plug-receiving opening extending through a side wall of a nut body into the threaded bolt-receiving opening thereof, comprising plug material feeding and driving means effective to advance an end of the plug material into engagement with the outer end of the plug-receiving opening, to rotate the plug material to thread it into the plug-receiving opening and to cause relative advance between the plug material and the plug material supporting and driving means longitudinally of the plug material to provide fresh plug material having an end extending therebeyond.

Other objects and features of the invention will become apparent as the description proceeds, especially when taken in conjunction with the accompanying drawing, illustrating preferred embodiments of the invention, wherein:

FIGURE 1 is an enlarged view of the essential parts of the plug inserting apparatus.

FIGURE 2 is a view similar to FIGURE 1 showing the plug supporting and driving head in its forward position.

FIGURE 3 is a fragmentary view showing a portion of the mechanism seen in FIGURES 1 and 2, with the head completing its stroke in one direction.

FIGURE 4 is a view similar to FIGURE 3 showing the completed lock nut and the relative position of the head.

FIGURE 5 is an enlarged view illustrating the manner in which the inserted plug fractures.

FIGURE 6 is a diagrammatic view illustrating a type of chuck suitable for use in the present invention.

FIGURE 7 is a fragmentary sectional view showing the invention applied to an annular collar or the like.

FIGURE 8 is a fragmentary sectional view showing the invention applied to an elongated element.

Before referring to the drawings the invention will be described in general terms. In the first place, the invention relates to the insertion of a plug, usually of a suitable plastic material such for example as nylon, in a laterally extending generally radial threaded plug-receiving opening and extending from a side wall of a nut body into the threaded bolt-receiving opening thereof. The problem of inserting plugs of this type previously has been largely the problem of controlling the amount which the inner end of the plug protrudes into the bolt-receiving opening, and in the elimination of plug material at the outer side of the nut body. It has been found that if the nut body is placed on a mandrel of predetermined size, and if a rod or length of plastic material is screwed into the plug-receiving opening, eventually the inner end of the plug engages the mandrel, thus predetermining the amount of protrusion of the inner end of the plug. A further rotation of the plug material relative to the nut body causes the rod or length of plug material to twist off entirely within the threaded plug-receiving opening. The line of fracture resulting from twisting off of the inserted plug from the remainder of the elongated plug material takes place substantially along the crest of the first or outer convolution of thread in the threaded plug-receiving opening. Thus, the outer end of the inserted plug is wholly within the plug-receiving opening so that no separate step of removing plug material from the exterior surface of the nut body is required.

Referring now to the drawings, there is illustrated more or less diagrammatically, a simplified apparatus adapted to perform the foregoing operation substantially automatically. The nut body 10 is herein shown as a hexagonal nut having a central threaded bolt-receiving opening 12 and a laterally extending generally radial threaded plug-receiving opening 14 which extends from a side 16 of the nut body to the central threaded bolt-receiving opening therein.

In accordance with the present invention the nut body 12 is supported on a mandrel 18 and is retained on this mandrel by suitable support means herein indicated as upper and lower members 20 and 22 respectively. Support members 20 and 22 retain the nut 10 against rotation on the mandrel and may position the nut in centered relation on the mandrel so that uniform clearance exists between the mandrel and the interior threaded bolt-receiving opening 12. On the other hand, the nut 10 may be mounted for limited transverse movement so that when the plug is threaded through the plug-receiving opening 14, as will subsequently appear, the nut and mandrel may be relatively displaced so that the mandrel engages the inner surface of the threaded bolt receiving opening 12 at the side thereof directly opposite the threaded plug receiving opening 14.

Associated with the nut support structure is a driving and feeding head indicated generally at 24 which includes a chuck 26 adapted to grip an elongated rod or length of plug material 28. The head 24 is driven in rotation by suitable means such for example as a relatively wide drive gear 30 in mesh with a driven gear 32 affixed to the head. The head is reciprocated toward and away from the nut support by suitable means herein diagrammatically illustrated as an eccentric roller 34. The roller 34 is rotated by a shaft 36 and engages between flat radial surfaces 38 and 40. It will of course be apparent that during axial reciprocation of the head 24 it may be continuously rotated, since the gear 32 will remain at all times in mesh with the driving gear 30.

The chuck 26 may conveniently be of a three-jaw type diagrammatically illustrated in FIGURE 5, in which the jaws 42 are provided with driving edges 44 extending longitudinally of the rod as indicated in the figure which insure that the jaws will at all times impart rotation to the plug material or rod 28. On the other hand, the jaws are applied under only sufficient radial pressure to the rod 28 to insure advancement of the rod into engagement with the nut body and initiation of threaded engagement therewith. Thereafter, when the leading end of the rod has engaged in the threads in the threaded plug-receiving opening 14, the advance of the rod is determined by the relative rotation between the nut body and rod. In other words, the rod is driven in rotation at a predetermined speed and after initial engagement with the plug receiving opening is threaded into the opening at a rate determined by the rotation of the head 24, and not the rate of advance of the head 24 axially of the rod.

In FIGURE 1 the parts are shown with the head 24 fully retracted to the left and it will be observed that the leading end of the rod or plug material 28 is spaced laterally from the entrance to the threaded plug-receiving opening 14.

In FIGURE 2 there is shown the relationship of parts at a time when the head 24 has been advanced to its maximum depth feed position. It will further be observed that at this time the end portion of the rod or plug material 28 is threaded into the plug-receiving opening but has not been threaded completely through the opening. In other words, there is at this time a definite space between the end of the rod and the plug engaging surface of the mandrel. In FIGURE 2 with the parts as shown, it will be understood that continued rotation of the eccentric roller 34 will initiate the return stroke of the head 24.

Referring now to FIGURE 3 there is shown the relationship of parts occuring during the return stroke of the head 24 when the inner end of the plug material has been screwed completely through the threaded plug-receiving opening 14 and its inner end has engaged the mandrel 18. It will be observed that at this time the head 24 is in an intermediate position and is moving to the left as indicated by the arrow 46. This movement of the head results in slippage of the jaws longitudinally of the rod 28 so as to draw rod material beyond the head for the next operation. Sliding of the head on the rod material of course terminates as soon as the end of the rod within the threaded opening 14 is twisted off. Also in this figure, the fracture line 48 is indicated. This is the approximate location of the fracture line which will result from the continued rotation of the rod 28 after its inner end has engaged the mandrel 18. It has been found by thorough testing in production runs that the fracture of the rod material takes place within the threaded opening 14 substantially along the crest of the first convolution of the thread in the threaded plug-receiving opening. This fracture takes place in such a way that none of the plug material extends outwardly beyond the plane side surface 16 of the nut body and accordingly, a separate operation to remove such protruding plug material is not required. This is an important feature of the invention.

A second advantage resulting from the foregoing operation is that the inner end of the severed plug, which is indicated at 50 in FIGURE 6, is smoothed off or shaped by the mandrel 18 so that it cooperates most efficiently as a friction locking plug with bolts threaded into the nut body 10 in use.

Inasmuch as the relationship of parts illustrated in FIGURE 3, which is assumed to illustrate the relationship at the approximate instance of twisting off of the plug from the rod or plug material, takes place durirng the return stroke of the head 24, it will be apparent that the fresh twisted off end 52 of the plug material or rod 28 is moved away from the side of the nut body 10 to the position illustrated in FIGURE 6.

The completed nut 10 as seen in FIGURE 6 may of course be removed from the support members 20 and 22 and from the mandrel 18 while the head 24 is in retracted position, and replaced by a second nut. This may of course be accomplished manually or by suitable automatic feeding mechanism.

Referring now to FIGURE 4 there is shown in enlargement the relationship between the jaws 42, the rod of plug material 28, and the mandrel 18 at the instant of engagement between the inner end of the plug material 28 with the mandrel. The inclined broken line 54 illustrates the approximate zone of fracture along which the rod will be twisted off as a result of continued rotation of the driving jaws 42 after axial advance of the rod 28 has been arrested by the mandrel acting as a plug stop element. It will of course be appreciated that at the opposite side of the nut the crest of the thread extends substantially along the line 56 so that the fracture resulting from twisting off the plug from the end of the plug material does not produce a flat radial surface. However, in all cases this fracture takes place entirely within the threaded opening 14. Clearly, the reason for this is that exterior of the opening the rod 28 is not weakened by the threads which are formed therein as the plug material is advanced to self-threading relation into the threaded plug-receiving opening 14.

While in the illustrated embodiment of the invention the nut is shown as supported in fixed or substantially fixed relationship while the end of the rod is advanced while being rotated so as to thread itself into the threaded plug-receiving opening, it will of course be apparent that if desired the nut body as a whole could be rotated about the axis of the threaded plug-receiving opening 14, and as a second variation, the head 24 could remain stationary while the nut support structure could not only rotate the nut about the axis of the plug-receiving opening 14 but could also effect movement axially into engagement with the end of the rod to initiate the threading action and then away from the head 24 to draw a new supply of plug material through the jaws 42 of the chuck 26.

While it is very simple to provide for the feeding of a new length of plug material through the head by providing for a frictional sliding engagement between the chuck 26 and the rod 28, it would also be possible to provide for feeding advancement of the plug material by a pair of jaws movable toward and away from each other axially of the rod so that a predetermined length of rod material could be advanced following each feed operation. However, the illustrated arrangement is preferred since it is completely unnecessary to provide for advance of a definite measured length of material, since the longitudinal feeding of the plug material relative to the head automatically compensates for minor but possibly accumulating variations in length of the severed plugs 50.

In the foregoing the specific description has been limited to the application of a locking or friction plug to a nut. It is of course to be understood that the invention is not so limited. In FIGURE 7 for example, there is illustrated the application of a friction or locking plug 70 in the threaded transverse or radially extending opening 72 formed in an annular body 74 having a central or inner opening 76. It will be understood that the annular body 74 may be a collar or the like.

Referring to FIGURE 8 there is indicated the application of the present invention to an elongated body 80 having a channel 82 therein and a threaded opening 84 extending completely through a side wall of the channel. In this case it is desired to provide a friction element 86 having its inner end projecting a predetermined distance within the channel 82. Since the threaded opening 84 is provided in the side wall 87 it will be apparent that the side wall 88 constitutes an obstruction which renders difficult if not impossible, the efficient provision of a blind recess at the location of the threaded opening 84 into which the friction plug 86 could be inserted. In this case, as in the nut and annular body, the threaded opening 84 is provided completely through the side wall and the plug is screwed into the threaded opening until its advance is arrested by a suitable stop element positioned within the channel 82. It will of course be understood that the channel may constitute a guide for a sliding element in a machine tool or the like.

The drawing and the foregoing specification constitute a description of the improved lock nut and a method and apparatus for producing the same in such full, clear, concise and exact terms as to enable any person skilled in the art to practice the invention, the scope of which is indicated by the appended claims.

What I claim as my invention is:

1. Apparatus for inserting a lock plug in a threaded plug-receiving opening extending from a side wall to a central opening of an annular body comprising a support for the body, a mandrel shaped to enter the central opening with predetermined radial clearance, a rotary head having a portion shaped to grip a length of plug material, means for advancing said head to thread the plug material into said plug-receiving opening and operable to continue driving said plug material in rotation until the inner end thereof is arrested by said mandrel, at which time said plug material twists off substantially along the crest of the first outer convolution of thread within said plug-receiving opening, and means for effecting an advance of plug material relative to said head between successive advance movements of said head.

2. The method of inserting a friction plug into a threaded transverse opening extending completely through a wall of a body in such a way as to cause one end of said plug to extend beyond one side of said wall a precisely predetermined distance and to cause the other end of said plug to be completely received within said threaded opening to prevent extension thereof beyond the other side of said wall which comprises providing a plug stop element at a predetermined spacing from the said one side of said wall in registration with said opening, screwing a length of a plastic material through the transverse opening until its inner end engages said stop element, and continuing to turn said plastic material thereafter to twist it off substantially along the crest of the first convolution of thread within the transverse opening at the radially outer end thereof.

3. Apparatus for inserting a lock plug in a threaded plug-receiving opening extending through a side wall of a body comprising a support for the body, a plug stop member positioned in spaced relation to the wall in alignment with the threaded opening therethrough, a rotary head including means to grip a length of plug material at a point spaced from a free end thereof, means for reciprocating said head in alignment with the threaded opening in advance and retraction strokes to initiate threading of the plug material into the threaded opening during initial advance of said head and operable to continue driving said plug material in rotation until and after the inner end thereof is arrested by said plug stop member, at which time the plug material twists off substantially along the crest of the first outer convolution of thread within the threaded opening, and means for advancing said plug material longitudinally relative to said head between successive advance strokes thereof.

4. Apparatus as defined in claim 3 in which said head comprises jaws effective to drive said plug material in rotation and to grip said plug material with sufficient frictional force longitudinally thereof to initiate threaded engagement between said plug material and the threads in the threaded opening of the body but to provide for slippage of said jaws along said plug material upon movement of said head in its retraction stroke during continued advance of the plug material in the threaded opening of the body.

5. Apparatus as defined in claim 4 comprising means for timing the reciprocation of said head to initiate its retraction stroke prior to severance of the plug material following engagement with the plug stop member and to terminate the retraction stroke after severance of the plug material.

6. Apparatus for inserting a lock plug in a threaded plug-receiving opening extending from a side wall to the threaded central opening of an annular body comprising a support for the body, a mandrel shaped to enter the central opening with predetermined radial clearance, a rotary head having jaws effective to grip the elongated plug material so as to apply sufficient rotary force thereto to twist off the material and to apply a limited longitudinal frictional force sufficient, together with the rotary force, to initiate threading of the plug material into the threaded opening but to provide for relative slippage between the jaws and the plug material when the limited longitudinal force is exceeded, means for advancing said head to thread the plug material into said plug-receiving opening and operable to continue driving said plug material in rotation until the inner end thereof is arrested by said mandrel, at which time said plug material twists off substantially along the crest of the first outer convolution of thread within said plug-receiving opening, and means for retracting said head during the interval following initial threading of the plug material into the threaded plug-receiving opening and prior to twisting off the plug material in the opening, to reposition the head and plug material for a successive operation.

7. Apparatus for inserting a lock plug in a threaded plug-receiving opening extending from a side wall to the central opening of an annular body comprising a support for the body, a mandrel shaped to enter the central opening with predetermined radial clearance, a rotary head having jaws effective to grip the elongated plug material so as to apply sufficient rotary force thereto to twist off the material and to apply a limited longitudinal frictional force sufficient, together with the rotary force, to initiate threading of the plug material into the threaded opening but to provide for relative slippage between the jaws and the plug material when the limited longitudinal force is exceeded, said head being reciprocable toward and away from the annular body while the plug material is being advanced in the plug-receiving opening.

8. Apparatus for inserting a lock plug in a threaded plug-receiving opening extending from a side wall to the central opening of an annular body comprising a support for the body, a mandrel shaped to enter the central opening with predetermined radial clearance, a rotary head having jaws effective to grip the elongated plug material so as to apply sufficient rotary force thereto to twist off the material and to apply a limited longitudinal frictional force sufficient, together with the rotary force, to initiate threading of the plug material into the threaded opening but to provide for relative slippage between the jaws and the plug material when the limited longitudinal force is exceeded, said jaws being reciprocable toward and away from the annular body in a fixed stroke, said stroke being timed to initiate its movement away from the body while the plug material is being advanced in the plug-receiving opening and to terminate its movement away from the body after twist-off of the plug to retract the end of the plug material from the annular body.

9. Apparatus of the class described comprising a support including a plug stop element adapted to enter the central opening of an annular body having a threaded plug-receiving opening extending through a side wall thereof into the central opening thereof, a plug support adapted to grip an elongated rod of plug material to prevent relative rotation between the rod and plug support while providing for a limited frictional force to oppose sliding therebetween longitudinally of the rod sufficient to initiate threading of the plug material into the threaded opening but to provide for relative slippage when the limited force is exceeded, means for effecting relative rotation between said supports, means for effecting approach and separation between said supports in timed sequence to cause relative approach between said supports to start screwing the end of the rod of plug material into the plug-receiving opening, then during continued advance of the plug into the plug-receiving opening as a consequence of continued relative rotation between said supports initiating separation between said supports to cause relative sliding between said plug support and the rod longitudinally of the rod, and continuing relative rotation between said supports until the rod end engages the plug stop element and the rod twists off within the plug-receiving opening substantially along the crest of the first thread convolution at the radially outer end thereof.

10. Apparatus of the class described comprising a body support including a plug stop element adapted to enter the central opening of an annular body having a threaded plug-receiving opening extending through a side wall thereof into the central opening thereof, a plug support adapted to grip an elongated rod of plug material to prevent relative rotation between the rod and plug support while providing for a limited frictional force to oppose sliding therebetween longitudinally of the rod sufficient to initiate threading of the plug material into the threaded opening but to provide for relative slippage when the limited force is exceeded, means for effecting approach and separation between said supports in timed sequence to cause relative approach between said supports to start screwing the end of the rod of plug material into the plug-receiving opening, then during continued advance of the plug into the plug-receiving opening as a consequence of continued relative rotation between said supports initiating separation between said supports to cause relative sliding between said plug support and the rod longitudinally of the rod, continuing relative rotation between said supports until the rod end engages the plug stop element and the rod twists off within the plug-receiving opening substantially along the crest of the first thread convolution at the radially outer end thereof, and continuing relative separating movement between said supports following twist-off of the rod to position the fresh end of the rod in position to be spaced from a new body received in said body support.

11. Apparatus of the class described comprising a support for a body having a threaded opening extending through a wall thereof, a plug stop element positioned at one side of said wall in alignment with the threaded opening and in predetermined spaced relation thereto, a plug support adapted to grip an elongated rod of plug material at a point spaced from a free end thereof with the rod in alignment with the threaded opening, said plug support including means to prevent relative rotation between the rod and plug support while providing for relative frictionally opposed sliding movement therebetween longitudinally of the rod, means for effecting relative rotation between said supports, means for effecting approach and separation between said supports in timed sequence to cause relative approach between said supports to start screwing the end of the rod of plug material into the threaded opening and for thereafter initiating relative separation between said supports prior to engagement between the end of the rod and said plug stop element.

12. Apparatus as described in claim 11 in which the means for effecting approach and separation between the supports is effective to terminate relative separation between said supports after the portion of the rod within the threaded opening has been twisted off from the remainder of the rod as a result of continued rotation following its engagement with the plug stop element.

13. The method of inserting a friction plug into a threaded transverse opening extending completely through a wall of a body in such a way as to cause one end of said plug to extend beyond one side of said wall a precisely predetermined distance and to cause the other end of said plug to be completely received within said threaded opening to prevent extension thereof beyond the other side of said wall which comprises supporting the body in fixed positions, providing a plug stop member at a predetermined spacing from one side of the wall in registration with the threaded opening, positioning a rod of a plastic material in alignment with the threaded opening, applying a rotary driving force to said rod at a point spaced from the end thereof adjacent the wall of sufficient magnitude to twist off the rod when its rotation is arrested, applying a longitudinal feeding force to the rod of sufficient magnitude to advance the end of the rod into engagement with the threads at the adjacent end of the threaded opening and in conjunction with the rotation thereof to initiate screwing of the rod into the threaded opening, and during continued advance of the rod into the threaded opening, reversing the direction of application of force longitudinally of the rod to apply a force tending to withdraw the rod from the body but at a magnitude insufficient to overcome the resistance of the threaded engagement between the portion of the rod in the opening and the threads in the opening, continuing the application of the rotary driving force until the rod twists off along the first full thread convolution within the threaded opening, and continuing the application of the force tending to withdraw the rod following severance to space the exposed end of the rod from the body.

References Cited in the file of this patent

UNITED STATES PATENTS

| | | |
|---|---|---|
| 1,320,208 | Curtis | Oct. 28, 1919 |
| 2,462,603 | Boots | Feb. 22, 1949 |
| 2,520,122 | Brutus | Aug. 29, 1950 |
| 2,779,039 | Borner | Jan. 29, 1957 |
| 2,948,056 | Mueuchinger | Aug. 9, 1960 |
| 2,968,821 | Morin | Jan. 24, 1961 |

FOREIGN PATENTS

| | | |
|---|---|---|
| 495,195 | Great Britain | Nov. 8, 1938 |